United States Patent [19]
Zagala et al.

[11] 3,851,561
[45] Dec. 3, 1974

[54] FAIRING, ROCKET LAUNCHER

[75] Inventors: Pasquale Rudolph Zagala, Ridgecrest; Bill Moore, Inyokern, both of Calif.; Vincent J. Taylor, deceased, late of China Lake, Calif. by Wayne George Zellmer, executor

[73] Assignee: The United States of America as represented by the Secretary of the Navy, Washington, D.C.

[22] Filed: May 4, 1973

[21] Appl. No.: 357,403

Related U.S. Application Data

[63] Continuation-in-part of Ser. No. 22,464, March 25, 1970, abandoned.

[52] U.S. Cl.................................. 89/1.8, 89/1.817
[51] Int. Cl............................................... F41f 3/04
[58] Field of Search ..... 89/1.8, 1.806, 1.807, 1.816, 89/1.817

[56] References Cited
UNITED STATES PATENTS

| | | | |
|---|---|---|---|
| 2,844,073 | 7/1958 | Re et al. | 89/1.807 |
| 3,031,932 | 5/1962 | Fite, Jr. | 89/1.806 |
| 3,315,565 | 4/1967 | Nash | 89/1.816 X |
| 3,362,291 | 1/1968 | DeLuca | 89/1.817 |

*Primary Examiner*—Samuel W. Engle
*Attorney, Agent, or Firm*—R. S. Sciascia; Roy Miller; Gerald F. Baker

[57] ABSTRACT

Fairing for a rocket launcher consisting of a uniform shell of low density polystyrene adapted to be attached to the nose of a rocket launcher. The shell breaks up in such a way as to limit particle size when the rockets are dispensed from the launcher. The fairing includes a rim adhesively attached within the shell adapted to fit on one end of the launcher.

14 Claims, 5 Drawing Figures

FAIRING, ROCKET LAUNCHER

CROSS REFERENCE TO RELATED APPLICATIONS

This application is a Continuation-in-Part of applicants' copending application Serial No. 22,464 filed March 25, 1970, now abandoned.

BACKGROUND OF THE INVENTION

Typically, air borne rocket launchers comprise a housing for a plurality of rockets adapted to be attached to the underside of an aircraft. The housing is generally cylindrical in shape and, in high speed aircraft, it is necessary to provide nose and tail fairings for the launcher housing to preserve aerodynamic stability. These fairings, of course, must be structurally strong enough to withstand the thrust of air pressures to which they are subjected and yet must be so constructed as to be easily dispensed with when the rockets are fired.

Prior art fairings have incorporated explosive devices or release devices which either broke or removed the fairing before the rockets were fired. An improvement on this solution to the problem came about with the invention of frangible fairings such as is the subject of U.S. Pat. No. 3,140,638 issued to Peter L. DeLuca on July 14, 1964, wherein there was provided nose and tail fairings designed to fragmentize without damage to the aircraft surfaces.

SUMMARY OF THE INVENTION

According to the present invention, a frangible fairing is provided which breaks up into small pieces, the largest pieces of which not only will not damage aircraft surfaces but also, when ingested in jet engines, have no detrimental effects upon the engine.

DESCRIPTION OF THE PREFERRED EMBODIMENTS

The specific configuration of the fairing depends upon competing aerodynamic and structural considerations. Aerodynamically, an ogival shape is preferred. Structurally, however, a shape tending toward the spherical is desired. The more spherical the shape, the stronger the fairing and thus the thinner the walls thereby reducing the weight of the fairing.

Figure 1:
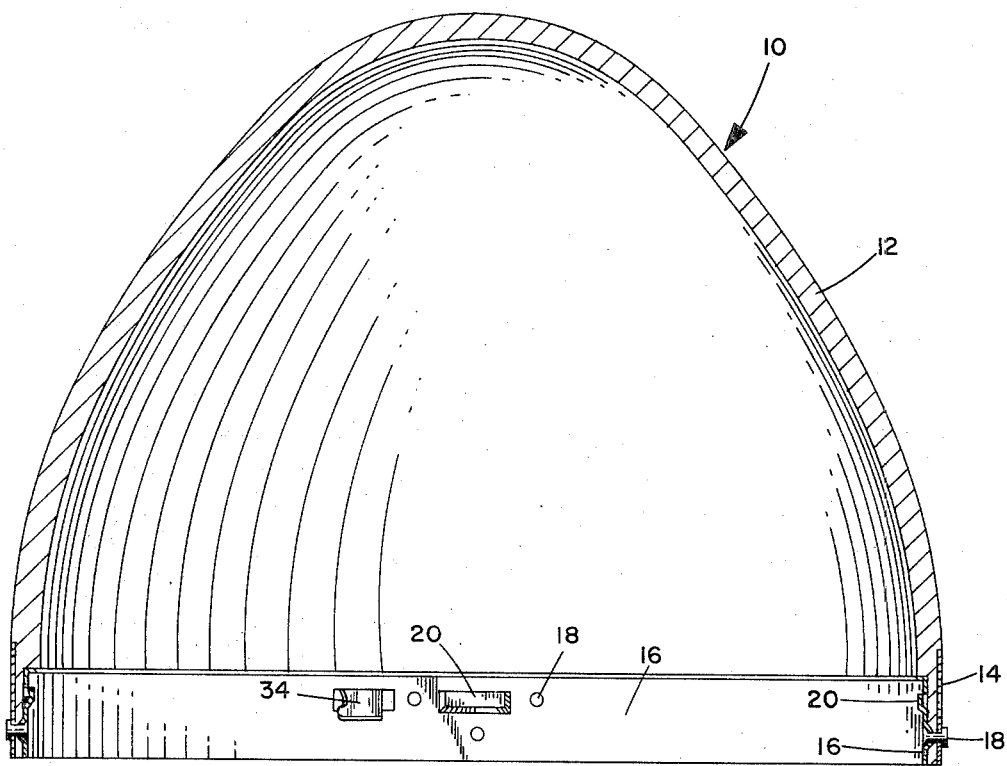
FIG. 1 is a diametral cross sectional view along the longitudinal axis of a preferred embodiment of the invention.
Figure 2:
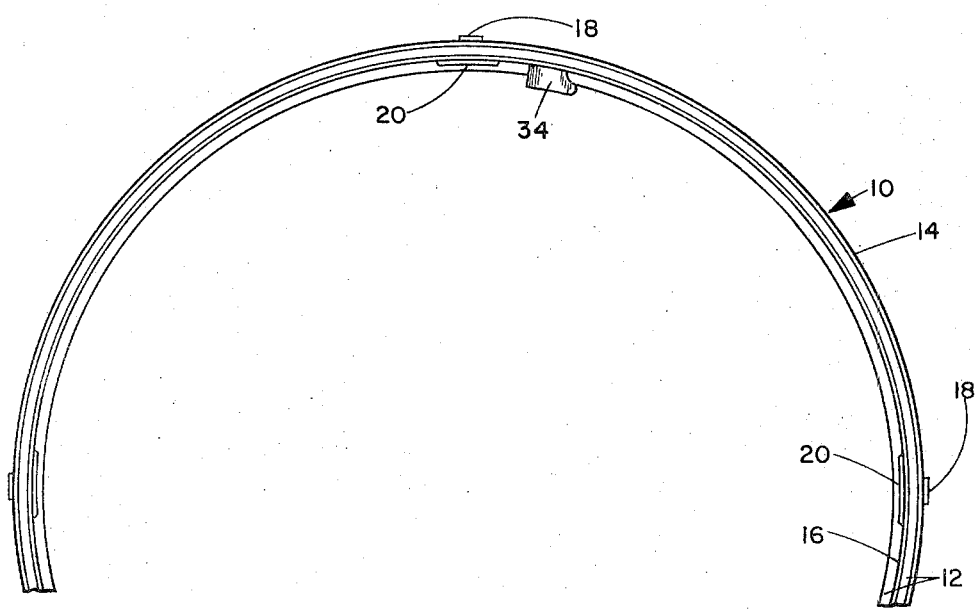
FIG. 2 is a partial end view of the embodiment of FIG. 1 rotated 180°.

The frangible fairing 10 shown in FIGS. 1 and 2 comprises a body of uniform thickness of polystyrene designed to be fitted to a cylindrical body member of a rocket launcher by means of an annular inner metal band or rim 16. As shown in FIGS. 1 and 2, the annular rim 16 has a plurality of tabs 20 formed therein designed to fit into "bayonet type" slots on the launcher housing. The polystyrene shell is foamed to shape and the annular rim adhesively fastened therein. An external band 14 is then fastened to the assembly by means of rivets 18 or the like.

The fairings are designed to fit a rocket launcher similar to the one illustrated in FIG. 1 of U.S. Pat. No. 3,315,565 issued to J. J. Nash. As shown in FIG. 1 of the Nash patent, the ends of the rocket launcher have what are called "bayonet type" slots to receive the tabs 20 of the fairing 10 according to the present invention. The fairing 10 is simply placed over the end flange of the launcher with the tabs 20 entering the slots and the fairing is rotated through about 15 degrees clockwise to secure the fairing to the launcher housing.

Figure 3:
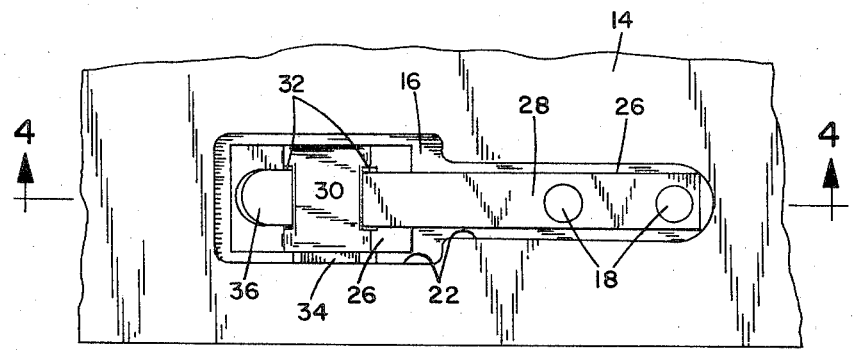
FIG. 3 is an enlarged detail view of the latching means.
Figure 4:
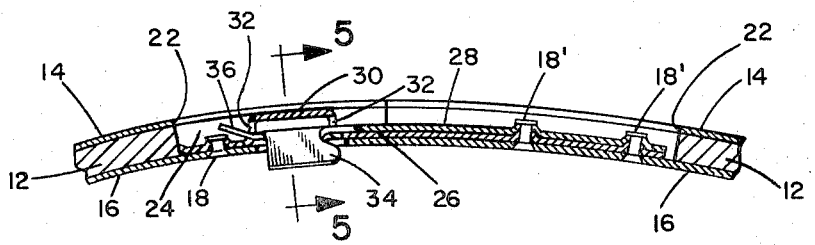
FIG. 4 is a cross sectional view taken along line 4—4 of FIG. 3.
Figure 5:
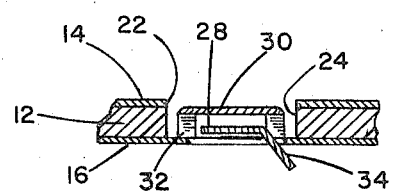
FIG. 5 is a cross sectional view taken along line 5—5 of FIG. 4.

In FIGS. 3–5 of the drawing there is shown a spring device 28 for releasably preventing the fairing from turning after it has been installed. The external band 14 is cut away at 22 and the polystyrene material 12 is cut away at that point to form a recess 24. The inner band or rim 16 has a stiffener 26 riveted thereto in recess 24 and a spring 28 is riveted to the stiffener 26 and the rim 16. The stiffener 26 has a portion 30 raised above spring 28 forming a protective and limiting stop. Spring 28 passes through 30 at cutout portion 32 and ends in a finger tab 36. Spring 28 has an extending tab 34 projecting therefrom under the protecting and limiting stop 30 as shown in FIGS. 4 and 5. The tab 34 projects at an angle as shown in FIG. 5. The optimum thickness of the fairing shell is about one-half inch and the latch hardware is recessed below the outer surface as shown in FIGS. 4 and 5.

In use, the fairing 10 is placed over a flange on the forward end of a rocket launcher and pushed rearwardly until the rear edge of the fairing is in place against a forward edge of the rocket launcher. The fairing 10 is then turned about 15 degrees clockwise so that the lugs 20 hold the fairing onto the flange of the rocket launcher. The tab 34 slides or rides up on the flange on the rocket launcher and, when the fairing is rotated, the tab 34 drops down into one of the bayonet slots on the flange. In other words, the tab 20 nearest the tab 34 enters a particular slot and clockwise rotation of the fairing causes tab 34 to drop down into the same slot.

In order to remove the nose fairing for any reason, the finger tab 36 may be engaged and lifted thus lifting tab 34 and enabling rotation of the fairing in a counter clockwise direction to line up tabs 20 with the open part of the locking slots of the launcher flange.

The polystyrene of the fairing must be sufficiently frangible and of low density (approximately 8–12 lbs. per cubic foot) so that pieces of the fairing will not cause damage to aircraft but must be capable of being molded in the configuration shown in FIG. 1 to withstand about 20 p.s.i. air pressure.

What is claimed:

1. A rocket launcher fairing for use with an elongated rocket launcher, said fairing comprising a hollow shell having a rounded streamlined surface, said shell being open at one end and formed of a low-density frangible material, an annular rim conforming substantially to said shell opening, said rim being secured to the inner hollow surface of said shell, and securing means mounted on said rim, said securing means including a latching aperture in said annular rim and a resilient latching means secured to said rim and extending into said aperture for engagement with complementary securing means on said rocket launcher, the securing means also including tabs adapted to engage the complementary securing means on said rocket launcher, and wherein said fairing shell includes cutout portions over said annular rim, said latching means protruding radially outwardly from said rim into said cutout portion, the outermost protrusion of said latching means being recessed from the outer streamlined surface of said shell, said open end of said shell formed to accommodate the end of said rocket launcher such that said securing means engages said rocket launcher for detachable affixation of said fairing to said launcher.

2. The rocket launcher of claim 1 further including an outer band attached to said shell over said annular rim and fastened to said rim through said shell.

3. The rocket launcher fairing of claim 1 wherein said polystyrene has a density of approximately 8 lbs. per cubic foot.

4. The rocket launcher fairing of claim 1 wherein said annular rim is recessed within the inner shell wall below the streamlined surface of said fairing.

5. The rocket launcher fairing of claim 1 wherein said shell includes an annular recess at said shell opening within the inner wall portion of said fairing shell, said annular rim being secured to said shell at said annular recess.

6. The rocket launcher fairing of claim 5 wherein said annular rim is disposed intermediate said fairing shell and said rocket launcher in mounted position of said fairing on said rocket launcher.

7. The rocket launcher fairing of claim 1 wherein said securing means is spaced from said fairing shell.

8. A rocket launcher fairing for use with an elongated rocket launcher, said fairing comprising a hollow shell having a rounded streamlined surface, said shell being open at one end and formed of a low-density frangible material, an annular rim comforming substantially to said shell opening, said rim being secured to the inner hollow surface of said shell, and securing means mounted on said rim, said securing means including a latching aperture in said annular rim and a resilient latch secured to said rim and extending into said aperture for engagement with complementary securing means on said rocket launcher, the securing means also including tabs protruding inwardly from said rim adapted to engage the complementary securing means on the rocket launcher, said open end of said shell formed to accomodate the end of said rocket launcher such that said securing means engages said rocket launcher for detachable affixation of said fairing to said launcher.

9. The rocket launcher fairing of claim 8 wherein said polystyrene has a density of approximately 8 lbs. per cubic foot.

10. The rocket launcher fairing of claim 8 wherein said annular rim is recessed within the inner shell wall under the streamlined surface of said fairing.

11. The rocket launcher fairing of claim 8 wherein said shell includes an annular recess at said shell opening within the inner wall portion of said fairing shell, said annular rim being secured to said shell at said annular recess.

12. The rocket launcher fairing of claim 11 wherein said annular rim is dispoed intermediate said fairing shell and said rocket launcher in mounted position of said fairing on said rocket launcher.

13. The rocket launcher fairing of claim 8 wherein said securing means is spaced from said fairing shell.

14. The rocket launcher fairing of claim 8 further including an outer band attached to said shell over said annular rim and fastened to said rim through said shell.

* * * * *